E. DEER.
Improvement in Mill Stone Dress.

No. 122,369.  Patented Jan. 2, 1872.

Witnesses:  
E. Wolff  
Francis McArdle

Inventor:  
E. Deer  
PER Munn & Co.  
Attorneys.

122,369

UNITED STATES PATENT OFFICE

EDMUND DEER, OF ANNAPOLIS, INDIANA.

IMPROVEMENT IN MILLSTONE DRESS.

Specification forming part of Letters Patent No. 122,369, dated January 2, 1872.

*To all whom it may concern:*

Be it known that I, EDMUND DEER, of Annapolis, in the county of Parke and State of Indiana, have invented a new and useful Improvement in Millstone Dress; and I do hereby declare that the following is a full, clear, and exact description thereof, which will enable others skilled in the art to make and use the same, reference being had to the accompanying drawing forming part of this specification.

This invention relates to improvements in dressing burr-millstones for grinding grain; and consists in feather-edge zig-zag furrows in the runner, and in feather-edge furrows in the bed-stone, arranged as hereinafter described.

Figure 1:
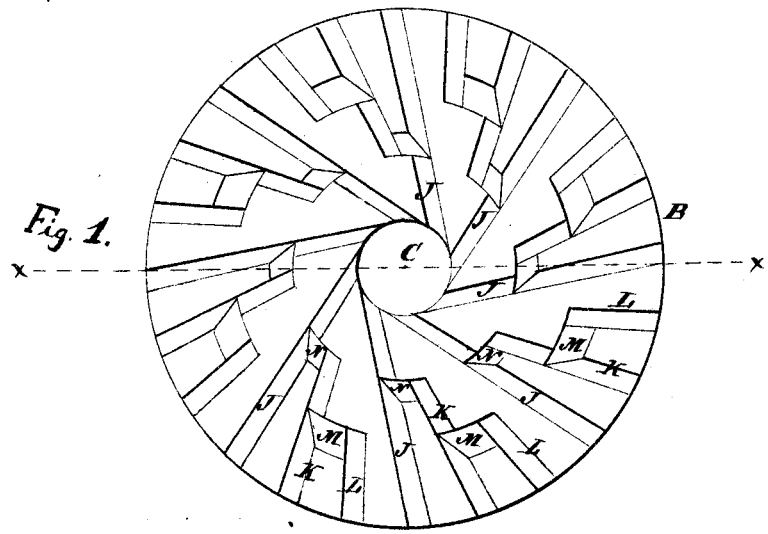
Figure 2:
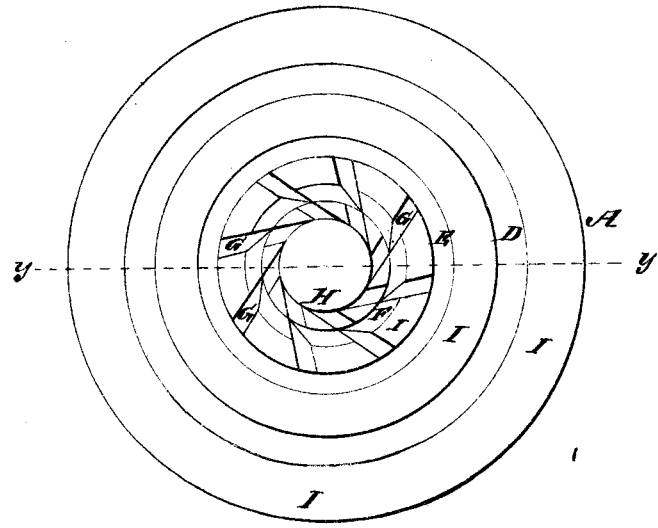
Figure 3:
Figure 4:

In the accompanying drawing, Figure 1 represents the face of the runner. Fig. 2 is a view of the face of the bed-stone. Fig. 3 is a vertical cross-section of Fig. 1 taken on the line *x x*. Fig. 4 is a cross-section of Fig. 2 taken on the line *y y*.

Similar letters of reference indicate corresponding parts.

A is the bed-stone. B is the running stone. C is the eye of the runner. The bed-stone has three feather-edge endless concentric furrows, marked respectively D, E, and F. G represents short furrows extending from the endless furrow E to the eye-circle H. There may be more or less in number of these short feathered furrows, and I do not confine myself exclusively to three endless furrows in the bed-stone. I represents the "land" or flat surface of the bed. I' is the skirt. In the runner, J represents a series of feather-edge furrows, which radiate from the edge of the eye C and extend to the periphery of the stone. Between the furrows J are intermediate furrows K and L, commencing at the periphery of the stone, connecting with each other and with the radial furrows J by means of the short furrows M and N, which latter are at nearly right angles with the furrows K and L. The intersection of these short furrows with each of the longer furrows at the particular point where the partially-ground grain is driven around the endless furrow of the bed, gives the short furrow ample opportunity to receive air and feed from the eye. The endless furrows in the bed diminish in size from the outer one inward. The advantages of the endless furrow are that, starting with the grain in the deep edge of the furrow, the grain is not driven directly up the slant of the furrow, but is driven round, gradually nearing the feather edge, and becoming more and more crushed and more nearly pulverized than it would be were it to pass directly across the furrow. Nothing remains at rest in these endless furrows, as the action of the air is too powerful to allow the partially-crushed grain to remain at rest. The "land" I of the skirt I' gives ample chance for the runner to act upon the unfinished flour, and there being no furrows in the skirt I' to receive the flour, it is thrown off by the runner fully ground. Furrowing of this description will do more grinding, with less friction, and consequently with less power than the "drop" now in common use. Instead of making endless feather-edge furrows in the bed-stone, the furrow may be made in sections, or form a series of arcs of circles with their feather edges in the direction of the skirt of the stone. I do not therefore confine myself strictly to endless or continuous furrows. The "land I" in the bed-stone may also be in sections so long as it forms, as a whole, a parallel with the skirt of the stone.

Having thus described my invention, I claim as new and desire to secure by Letters Patent—

1. The feather-edge furrows D, E, and F, in the bed A, and the angular furrows G in connection therewith, arranged substantially as described.

2. The combination of the furrows J, K, L, and M N with the endless furrows D, E, and F, substantially as and for the purposes described.

3. The solid endless land I in the bed-stone, in combination with feather-edge furrows, substantially as shown and described.

EDMUND DEER.

Witnesses:
MADISON KEENG,
MARTIN GREGG.

(57)